Patented May 10, 1932

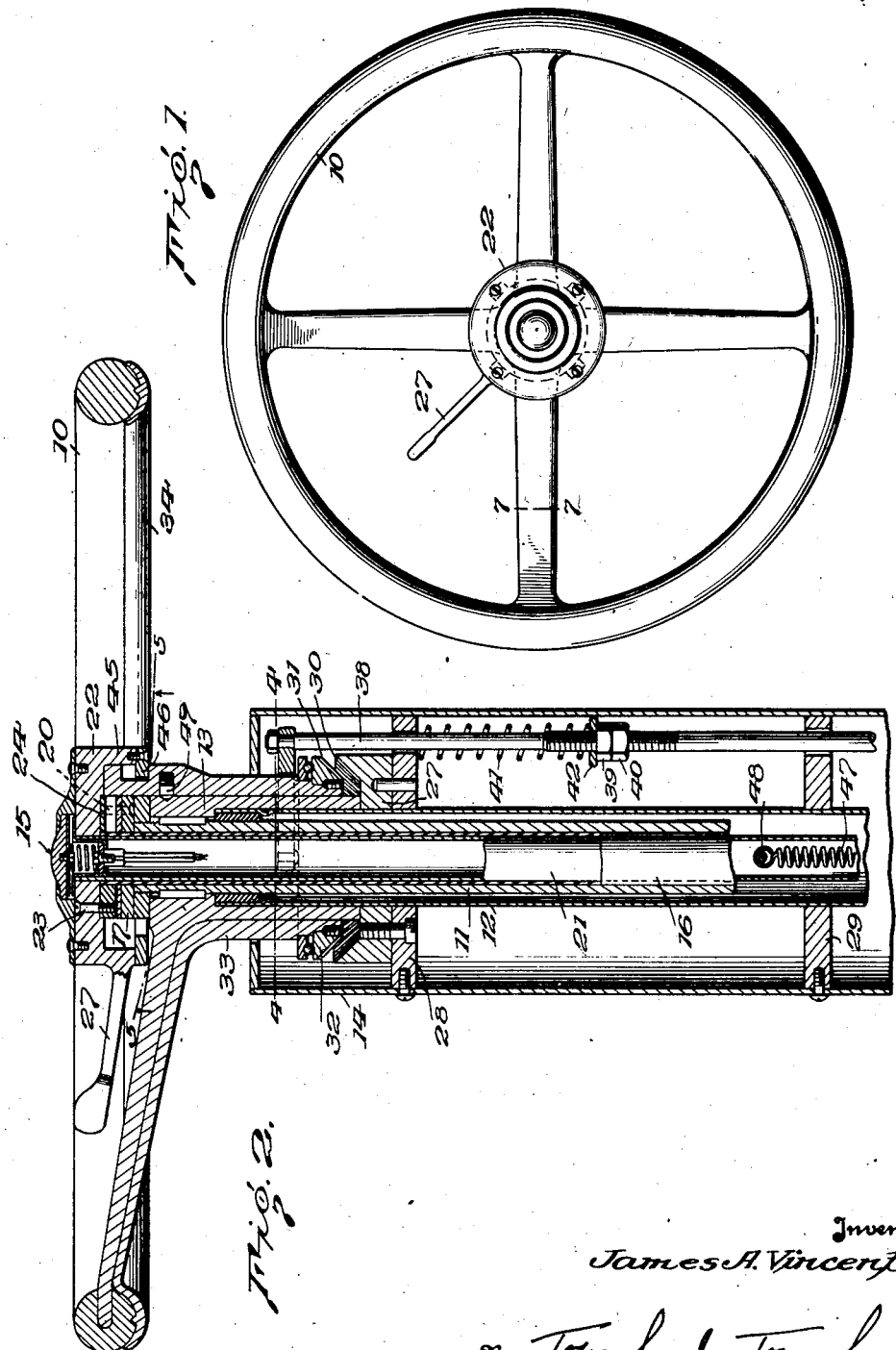

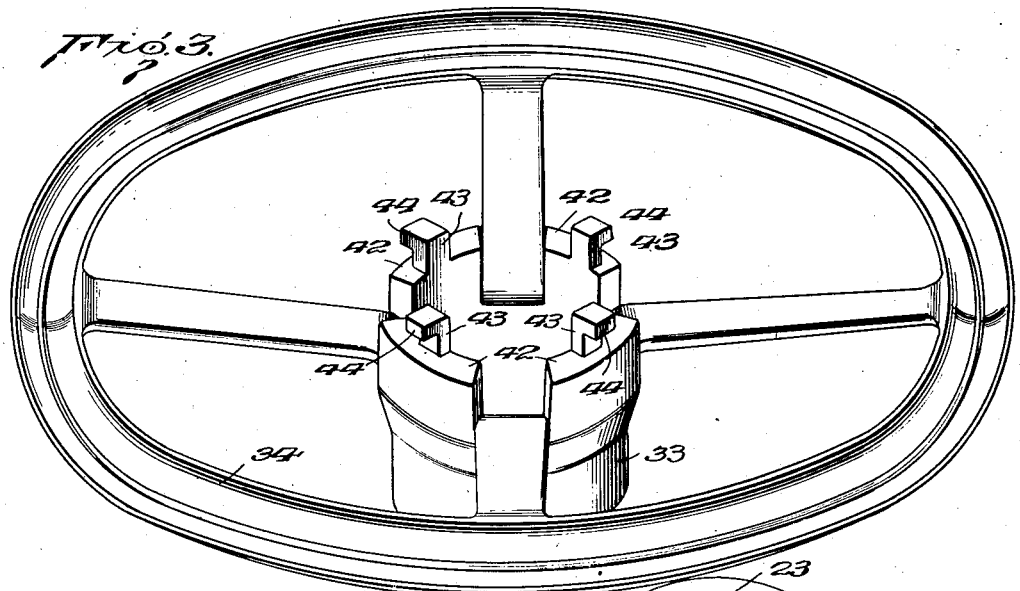
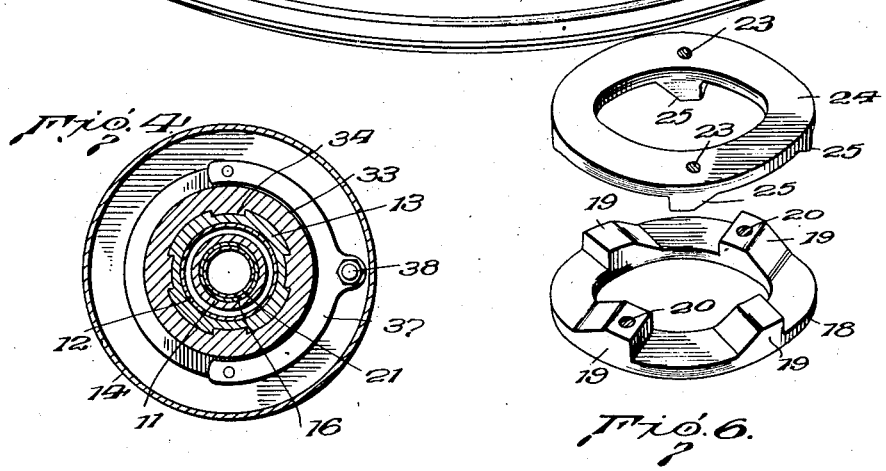
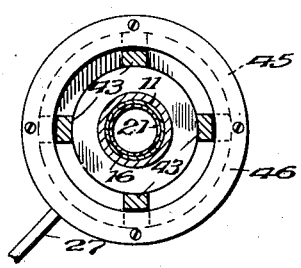
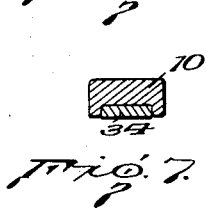

1,857,897

UNITED STATES PATENT OFFICE

JAMES A. VINCENT, OF PROVIDENCE, RHODE ISLAND

AUTOMATIC SAFETY CONTROL FOR MOTOR VEHICLES

Application filed November 4, 1930. Serial No. 493,385.

This invention relates to safety devices for motor vehicles and has particular reference to an automatic control associated with the steering wheel of a motor vehicle.

An important object of the invention is the provision of an automatic control associated with a steering wheel and operative upon the release of manual pressure applied to the steering wheel by an operator of the vehicle.

Another important object is the provision of automatic control means associated with a vehicle steering wheel and which is inoperative during the period in which the steering wheel is manually gripped by an operator of the vehicle.

A further object of the invention is to provide in a control of this character, manually operable means for rendering temporarily inoperative certain elements of the automatic control mechanism.

Other objects will be apparent from the description. The embodiment disclosed in this specification and the accompanying drawings has particular reference to a safety control mechanism intended for use in connection with the steering wheel equipment of motor buses, the mechanism being so arranged and adapted that upon release of the steering wheel by an operator, the mechanism automatically operates to cut off the ignition switch, to apply the brakes, to open the vehicle doors, and to lock the steering wheel in the position occupied at the instant of release. The mechanism is further adapted and intended, by the use of a selective control, to provide a means for manual release of the steering wheel without cutting off the switch. Under the operation of the selective control only the transmission is locked and the steering wheel may be released without cutting off the switch, applying the brakes, and opening the vehicle doors. The embodiment herein shown and described constitutes the best means I have thus far devised for reducing the invention to practice and it is intended that various changes and modifications may be made in the details shown, without departing from the scope of the invention as claimed. In the drawings:

Figure 1 is a top plan view of a steering wheel assembly constructed in accordance with provisions of the invention.

Figure 2 is a vertical section therethrough on the line 2—2 of Figure 1.

Figure 3 is a top perspective of a secondary or supplemental wheel employed in connection with the main steering wheel.

Figure 4 is a section on the line 4—4 of Figure 2.

Figure 5 is a section on the line 5—5 of Figure 2 looking upwardly from beneath the wheel.

Figure 6 is a group perspective of cam elements employed in the control mechanism.

Figure 7 is a section taken on the line 7—7 of Figure 1.

In detail the invention comprises a conventional steering wheel 10 attached in accordance with approved practice to the upper end of a conventional steering post 11 which is surrounded by a protective casing 12, the steering post and its protective casing as well as the hub portion 13 of the steering wheel being encased within a hollow cylindrical housing 14 which is rigidly mounted with respect to the body of the vehicle, not shown. The steering post 11 is hollow and is provided at its upper end with the conventional horn button assembly generally indicated as at 15. Positioned within the steering post is a hollow tube 16 which is fixed with respect to the steering post, having a rigid base connection with the body of the vehicle. The fixed tube 16 extends entirely through the steering post and has rigidly attached thereto adjacent its upper end a perpendicular collar 17 to the upper face of which is secured a cam ring 18 provided with spaced upright cam portions 19, the cam ring being secured to the collar 17 by fastening elements 20 of the screw threaded headed type and which are headed in the upper face of the collar being embedded in threaded relation through the cam bodies 19.

Disposed within the fixed hollow tube 16 is a second hollow tube 21 which is mounted for rotation within the tube 16 and which is also capable of a limited vertical reciprocation therein. At its upper end the movable tube 21 has rigidly attached thereto a hub 22 which forms the supporting base for the horn button assembly and which has attached to its under face, by means of headed securing elements 23, an upper cam ring 24 provided with depending cam bodies 25 arranged for camming action against the cam bodies 19 of the lower cam ring 18 carried by the fixed tube 16. As best indicated in Figure 2, the respective cam rings are superimposed. The hub portion 22 is provided with a radial operating lever 26 and it will be apparent that under manipulation of the lever 26 the hub 22 is rotated to engage or disengage the cam elements.

The cylindrical hub 13 of the steering wheel 10 has a bearing at its lower end on the flat central hub portion of a fixed cone clutch element 27, which clutch element is anchored to an annular support 28 carried by the housing 14 and rigidly secured to the walls thereof. Below the support 28 a second and similar support 29 is arranged within the housing 14, the two supports being centrally apertured to accommodate the passage therethrough of the steering post casing 12. The fixed clutch element 27 is provided with a toothed clutch face 30 adapted to be engaged by the toothed clutch face 31 of a movable clutch element 32 rigidly attached to the lower end of the cylindrical hub portion 33 of a secondary or supplemental steering wheel 34 which underlies the main steering wheel. The hub 33 is slidable over the hub 13 of the main steering wheel, the mounting being such as to permit a vertical reciprocation of the supplemental steering wheel with respect to the main steering wheel. Rotation between the respective steering wheel hubs is prevented by the sliding engagement of keys 34 on the secondary steering wheel hub in corresponding grooves formed in the body of the main steering wheel hub 13, as best illustrated in Figure 4. By reason of this connection it is obvious that the two steering wheels must rotate as a single unit.

The upper face of movable clutch member 32 is flat and is provided with a raceway for ball bearings 35 supporting an upper ball race 36 against the upper flat face of which rests in slidable relation the arms of a yoke 37 attached to the upper end of an actuator rod 38 guided between the supports 28 and 29 for vertical reciprocation within the housing 14. The actuator rod 38 is threaded through a portion of its length between the guides 28 and 29 to receive an adjusting nut 39 and a lock nut 40 by which means the tension of an expansion spring 41 coiled about the rod 38 between the upper guide support 28 and a bearing washer 42 loosely abutting the adjusting nut 39, can be regulated. Spring 41 provides a means by which rod 38 is constantly biased downward to draw down yoke 37 and depress the movable clutch member 32 into clutch engaged position to lock the steering wheel against rotation.

The actuator rod 38 is adapted at its lower end, not shown, for operative connection to the ignition switch for the vehicle engine, as well as to mechanism for operating the vehicle brakes and doors.

In Figures 1 and 2 the running position of the mechanism is illustrated, the secondary wheel 34 being lifted by the manual grip of an operator to lie against the main wheel 10 and as long as the operator's grasp is maintained on the steering wheel, the secondary wheel, its hub 33 and movable clutch member 32 will remain elevated against the tension of spring 41. When the operator's grip on the steering wheel is released for any reason, spring 41 draws down actuator rod 38, applying the brakes, opening the vehicle doors and cutting off the ignition. At the same time the depression of yoke 37 slides the secondary wheel hub 33 downwardly causing the movable clutch member 32 to engage with the fixed clutch member 27, whereupon due to the non-rotative engagement of the main and secondary steering wheel hubs the steering wheel will be locked against rotary movement.

In order to permit the vehicle to stand with engine idling and steering wheel unlocked, while an operator's hands are removed from the steering wheel a selective control is provided which functions to lock the transmission in neutral position. This selective control is operated through the lever 27 and its hub 22, which hub is secured to the upper cam ring 24 rigidly attached to the upper end of the rotatable and vertically slidable tube 21.

The hub 33 of the slidable secondary steering wheel is formed with upstanding segments 42 which extend up between the arms of the main steering wheel 10. Each segment 42 is provided with a vertical lug 43 having a lateral extension 44 radially outward of the hub and which is spaced above the upper edge of the segment. The selective control hub 22 is formed at its periphery with a depending skirt portion 45 to the bottom edge of which is attached a retaining ring 46 extending inwardly beneath the extension 44 on the segment lugs 43.

At its lower end, not shown, the movable tube 21 is adapted for operative connection to transmission lock means, also not shown, the rotary movement of the tube acting to control the lock means. A spring 47 connected between an internal stud 48 on the tube 21 and the base of the steering column mounting, not shown, acts to maintain a constant downward pull on the tube and maintains the cam rings 18 and 24 in close engagement.

Assuming the mechanism to be in running position, as in Figure 2, when the operator desires to release the steering wheel on stopping the vehicle and without the consequent locking of the wheel, application of brakes and opening of the doors, the control lever 27 is moved over one of the arms of the main steering wheel and before release thereof. This action rotates control hub 22 and its attached tube 21, whereupon under rotation of the tube the transmission mechanism of the vehicle is locked in neutral position. At the same time the upper cam ring 24 will have been rotated with respect to the fixed lower cam ring 18 causing the respective cams 25 and 19 to engage to elevate the control hub 22 and tube 21 against the tension of the spring 47. As the hub 22 rises it will carry up the retaining ring 46 and this ring will engage under the extensions 44 carried by the segment lugs 43 on the slidable secondary steering wheel hub 33 so that when the operator releases his grip on the steering wheel the sliding hub 33 will not be permitted to drop sufficiently far to bring about the operation of the mechanism actuated by the actuator rod 38. By means of this selective control it is evident therefore that the wheel can be released and the transmission will be locked in neutral position until the selective control has been thrown off.

When it is desired to throw off the selective control and return the parts to normal running position the operator resumes his grasp on the steering wheel and returns the lever 26 to its original position. This movement of the lever rotates the tube 21 to effect the unlocking of the transmission and at the same time disengages the cams 19 and 25, permitting the retaining ring 46 to drop from its engagement with the extensions 44 on the lugs 43 of the steering wheel hub 33. Were it not for the fact that the grip on the steering wheel had been resumed it will be apparent that a return of the selective control lever to its original position would bring about under the combined downward urge of the springs 47 and 41, a drop of the secondary steering wheel hub 33 into clutch engaged position to lock the steering wheel and set into operation the mechanism controlled by the actuator rod 38.

A small spring latch 49 is provided between the hubs of the respective steering wheels in order to relieve tension when the secondary steering wheel is held gripped into engagement against the under face of the main steering wheel but the tension of the latch 49 is insufficient to overcome the downward urge of the spring 41. As shown in Figure 7, the arms of the secondary steering wheel 34 are set in channels formed in the under face of the arms of the main steering wheel 10 so that when the two wheels are gripped together there is a positive engagement of the two which insures operation as a single unit.

While in this embodiment of the invention I have illustrated and described certain structural details, I desire it to be understood that the same do not constitute the sole means by which the invention may be practiced. Any desired changes and modifications may be made in such details as will fall within the scope of the invention as claimed.

I claim:

1. In a steering wheel assembly, a steering post, a steering wheel secured thereto, a fixed tube concentrically arranged within said steering post, a movable tube concentrically arranged within said first named tube, an operating handle carried by said movable tube above said steering wheel, said movable tube being adapted for operative connection with a vehicle control, a secondary steering wheel slidable on said first named steering wheel, means on said secondary steering wheel for locking both of said steering wheels in a fixed position, means on said secondary steering wheel for manually moving the same to unlocked position, a spring urged actuator rod associated with said steering post and adapted for connection with vehicle control means, and means connecting said actuator rod and secondary wheel for moving said secondary wheel under movement of said actuator rod.

2. In combination with a steering wheel assembly including a hollow steering post, a pair of concentrically arranged hollow tubes extending through said post, one of said tubes being fixed with respect to said post and the other of said tubes being movable with respect to said post and other tube, a handle carried by said movable tube above said steering wheel, cam means associated with said tubes whereby to effect sliding movement between said tubes upon rotation of said movable tube, a control member slidably mounted on said steering wheel and having a fixed connection with said movable tube, and means associated with said movable tube for limiting slidable movement of said control member on said steering wheel.

3. The combination with an automobile steering wheel, of a supplemental steering wheel manually engageable therewith upon manual grip of the steering wheel, spring means urging said supplemental wheel into released position, an actuator element associated with said spring means and adapted for vehicle control, means on said supplemental wheel for locking both of said wheels in a fixed position on release of the manual grip on said steering wheel, and selectively operable vehicle control means associated with said supplemental steering wheel for limiting the movement thereof with respect to the automobile steering wheel.

4. In combination, an automotive vehicle steering wheel assembly, a secondary steering wheel associated therewith and movable on the main wheel, vehicle control apparatus operable by movement of said secondary wheel in one direction, means manually operable to limit the operating movement of said secondary wheel, and other vehicle control apparatus operable by the actuation of said manually operable limiting means.

5. The combination with an automobile steering wheel, of a secondary steering wheel disposed thereunder and manually movable upwardly to contact the main wheel in manually gripped relation for normal operation of said main wheel, means for automatically returning the secondary wheel in a downward movement upon release from engagement against the main wheel, vehicle control means operable by said secondary wheel at the extent of its downward movement, and means selectively operable to arrest downward movement of said secondary wheel before reaching the extent of its movement.

6. The combination with an automobile steering wheel, of a secondary steering wheel movable vertically beneath the main wheel into and out of engagement with said main wheel, means on said secondary wheel for locking said main wheel against movement when said secondary wheel is at the extent of of its movement in one direction, a vehicle control actuator element carried by one of said wheels, and means controlled by said actuator element for arresting the movement of said secondary wheel before it reaches the extent of its travel.

In testimony whereof I affix my signature.

JAMES A. VINCENT.